(12) United States Patent
Tenbrook et al.

(10) Patent No.: US 8,744,391 B2
(45) Date of Patent: Jun. 3, 2014

(54) SIGNAL STRENGTH INDICATION METHODS FOR USE IN WIRELESS COMMUNICATION DEVICES

(75) Inventors: Keith A. Tenbrook, Crystal Lake, IL (US); Carl L. Shurboff, Grayslake, IL (US)

(73) Assignee: Motorola Mobility LLC, Chicago, IL (US)

( * ) Notice: Subject to any disclaimer, the term of this patent is extended or adjusted under 35 U.S.C. 154(b) by 1027 days.

(21) Appl. No.: 11/756,383

(22) Filed: May 31, 2007

(65) Prior Publication Data
US 2008/0299927 A1   Dec. 4, 2008

(51) Int. Cl.
*H04B 17/00*   (2006.01)

(52) U.S. Cl.
USPC ...................................... 455/226.2

(58) Field of Classification Search
USPC .................. 455/424, 425, 456.5, 456, 6, 561, 455/550.1, 575.1, 67.11, 179.1, 226.2, 455/226.3, 226.4, 440, 438, 428, 525, 522, 455/452.1, 295, 437; 370/332, 331, 333; 375/346, 254
See application file for complete search history.

(56) References Cited

U.S. PATENT DOCUMENTS

| | | | |
|---|---|---|---|
| 5,193,216 A | | 3/1993 | Davis |
| 5,428,816 A | * | 6/1995 | Barnett et al. ............... 455/437 |
| 5,432,842 A | * | 7/1995 | Kinoshita et al. ............ 455/440 |
| 5,432,843 A | * | 7/1995 | Bonta ........................... 455/438 |
| 5,564,094 A | * | 10/1996 | Anderson et al. ............ 455/295 |
| 5,574,968 A | * | 11/1996 | Olds et al. .................... 455/428 |
| 5,722,073 A | * | 2/1998 | Wallstedt et al. ............. 455/437 |
| 5,794,148 A | | 8/1998 | Mamaghani et al. |
| 5,867,782 A | | 2/1999 | Yoon |
| 5,991,901 A | | 11/1999 | Mulford et al. |
| 6,049,715 A | * | 4/2000 | Willhoff et al. ............... 455/436 |
| 6,052,566 A | * | 4/2000 | Abramsky et al. .......... 455/67.11 |
| 6,067,460 A | | 5/2000 | Alanara et al. |
| 6,118,773 A | * | 9/2000 | Todd .............................. 370/334 |
| 6,185,422 B1 | * | 2/2001 | Mattila .......................... 455/434 |
| 6,243,568 B1 | | 6/2001 | Detlef et al. |
| 6,697,378 B1 | | 2/2004 | Patel |
| 6,697,627 B1 | * | 2/2004 | Ueno .......................... 455/452.1 |
| 6,721,572 B1 | | 4/2004 | Smith et al. |
| 6,807,163 B1 | | 10/2004 | Shi |

(Continued)

FOREIGN PATENT DOCUMENTS

WO   0201837 A2   1/2002

OTHER PUBLICATIONS

International Search Report PCT/US2008/063372 dated Oct. 14, 2008.

*Primary Examiner* — Ankur Jain

(57) ABSTRACT

Embodiments include signal strength indication methods for use in wireless communication devices. In an embodiment, a method includes producing a default received signal strength indicator (RSSI) using default RSSI determination parameters. The method also includes determining that a received signal strength is inadequate, and producing an alternate RSSI, in response, where the alternate RSSI is produced using at least one alternate RSSI determination parameter that is different from at least one default RSSI determination parameter. In another embodiment, a method includes measuring multiple received signal strengths for multiple received signals from multiple base stations, and producing an alternate RSSI based on a received signal strength measurement for a strongest signal of the multiple received signals. An embodiment of a wireless communication device may include a processing subsystem adapted to perform embodiments of the methods.

20 Claims, 9 Drawing Sheets

(56) References Cited

U.S. PATENT DOCUMENTS

| | | |
|---|---|---|
| 6,904,282 B2 | 6/2005 | Cooper |
| 6,915,128 B1 | 7/2005 | Oh |
| 6,922,059 B2 | 7/2005 | Zank et al. |
| 6,925,378 B2 | 8/2005 | Tzamaloukas |
| 6,970,708 B1 | 11/2005 | Raith |
| 7,257,374 B1* | 8/2007 | Creigh ............ 455/41.2 |
| 7,363,050 B2* | 4/2008 | Nakano ............ 455/525 |
| 7,412,263 B2* | 8/2008 | Seier ............... 455/567 |
| 7,555,305 B2* | 6/2009 | Hsieh et al. ...... 455/522 |
| 2002/0082012 A1* | 6/2002 | Wang et al. ...... 455/435 |
| 2002/0147024 A1 | 10/2002 | Wan |
| 2003/0073455 A1* | 4/2003 | Hashem et al. .......... 455/525 |
| 2004/0053615 A1* | 3/2004 | Kim et al. ............... 455/436 |
| 2004/0090929 A1* | 5/2004 | Laux et al. .............. 370/311 |
| 2004/0267928 A1* | 12/2004 | Petrus ..................... 709/225 |
| 2006/0030270 A1* | 2/2006 | Cheng ................... 455/67.11 |
| 2006/0068731 A1 | 3/2006 | Seier |
| 2006/0183473 A1* | 8/2006 | Ukon ..................... 455/426.1 |
| 2006/0187105 A1* | 8/2006 | Sakata et al. ........... 341/155 |
| 2007/0206661 A1* | 9/2007 | Okada et al. ........... 375/141 |
| 2007/0211669 A1* | 9/2007 | Umatt et al. ........... 370/335 |
| 2007/0287399 A1* | 12/2007 | Lee ......................... 455/226.2 |
| 2008/0186917 A1* | 8/2008 | Wu et al. ................ 370/331 |
| 2009/0068972 A1* | 3/2009 | Jin et al. ................. 455/245.1 |

\* cited by examiner

SIGNAL STRENGTH INDICATION METHODS FOR USE IN WIRELESS COMMUNICATION DEVICES

TECHNICAL FIELD

The inventive subject matter relates generally to wireless communications, and more particularly to methods and apparatus for providing wireless signal strength indications.

BACKGROUND

Cellular telephones communicate with a cellular network (e.g., cellular base stations) over wireless communication channels. The signal quality perceived by a user depends on several factors, including the strength of the received signal (e.g., the signal-to-noise ratio or bit error rate) and the presence of interference (e.g., due to multi-path effects). When the cellular telephone is located in an environment in which received signal strengths are very low, the cellular telephone and the network may be incapable of maintaining a communication session, and the session may unexpectedly terminate. In colloquial terms, this typically is referred to as a "dropped call." An environment of low signal strengths also may preclude a cellular telephone from re-establishing a dropped call, or from establishing a new call with the network.

Most cellular telephone displays include a display element, referred to as a received signal strength indicator (RSSI), which reflects the strength of a received signal from the network. More particularly, during an ongoing communication session, the RSSI reflects measurements of the strength of a signal received over a communication channel that is allocated to the communication session. When a communication session is not in progress, the RSSI may reflect measurements of the strength of a control channel signal.

A typical RSSI includes a variable number of "bars" or other indicia. The number of bars displayed at any given time (and/or the relative heights of the bars) may be proportional to the measured, received signal strength. Accordingly, for example, when a received signal strength is very high, a maximum number of bars may be displayed, and when the received signal strength is very low, a minimum number of bars may be displayed. When the received signal strength falls below a low signal threshold, the cellular telephone may display zero bars, which indicates the presence of "no signal."

During a communication session, observation of the RSSI may enable a user to determine whether the received signal strength may be degrading to a point where an undesired communication session failure is likely to occur. In addition, during the process of attempting to establish a communication session, a user may observe the RSSI to determine whether the received signal strength is likely to be adequate to establish a new connection with the network. When a user observes that the RSSI indicates a low received signal strength, the user may attempt to relocate the telephone to an area in which a higher received signal strength is present. However, a user may not realize that a typical wireless device makes received signal strength measurements fairly infrequently (e.g., only once every 10-15 seconds). In addition, the RSSI may not accurately reflect an actual received signal strength measurement. Instead, a typical RSSI reflects an average of multiple, previous received signal strength measurements. Not realizing these calculation characteristics of the RSSI, a user may rapidly move the cellular telephone around in an attempt to find the presence of a higher strength received signal.

Dropped calls, the inability to establish calls, and difficulty in finding areas of high signal strength are a common frustration among users. Similar signal strength-related issues also may plague other types of wireless networks (e.g., wireless local area networks, radio networks, and other wireless networks). Accordingly, network providers and wireless communication device manufacturers continuously strive to improve signal levels in coverage areas, expand coverage areas, and develop hardware and software that may better compensate for received signals having low signal strengths. Regardless of these improvements, areas will continue to exist in which received signals will be too low to maintain communications sessions or to enable new sessions to be established. Therefore, what are needed are apparatus and methods to enable a user to more readily locate areas in which received signal strengths are adequate for robust communications with a wireless network. Other desirable features and characteristics of the present inventive subject matter will become apparent from the subsequent detailed description and the appended claims, taken in conjunction with the accompanying drawings and this background.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Embodiments described herein include methods and apparatus for producing received signal strength indicators. Embodiments of the methods may be performed by wireless communication devices (e.g., cellular telephones, radios, and computers) that communicate in the context of a wireless communication system (e.g., a cellular network, a radio network, a wireless computer network).

Figure 1:
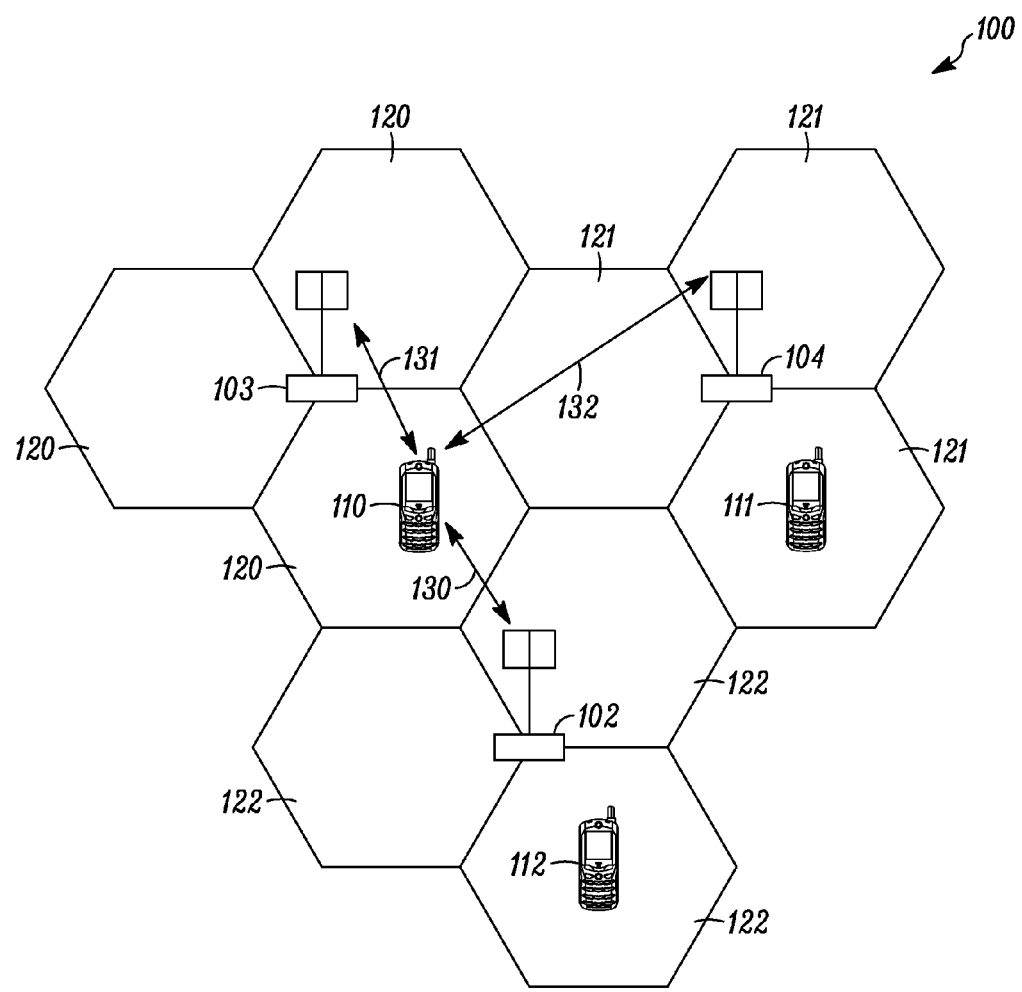
FIG. 1 illustrates a simplified perspective diagram of a cellular network, in accordance with an example embodiment.

FIG. 1 illustrates a simplified perspective diagram of a cellular network 100, in accordance with an example embodiment. Network 100 includes a plurality of base stations (BS) 102, 103, 104, and a plurality of wireless communication devices 110, 111, 112 (referred to herein as "wireless devices"). Although three BS 102-104 and three wireless devices 110-112 are illustrated in FIG. 1, network 100 may include more or fewer BSs and/or more wireless devices. In various embodiments, network 100 may include from one to thousands of BSs and from one to millions of wireless devices.

In various embodiments, network 100 may provide any one or more of a variety of types of communication services to wireless devices 110-112, including but not limited to voice communications, data communications, SMS (Short Messaging Service), MMS (Multimedia Messaging Service), email, voice over internet protocol (VoIP), and packet switching (e.g., for access to the Internet), to name a few. Communications between BSs 102-104 and wireless devices 110-112 may be governed by one or more communication technologies. For example, but not by way of limitation, communications between BSs 102-104 and wireless devices 110-112 may use any of a number of modulation and multiple access technologies. In various embodiments, modulation and multiple access on the uplink and/or downlink may be performed using one or more technologies selected from a group of technologies that includes, but is not limited to, Time Division Multiple Access (TDMA), Frequency Division Multiple Access (FDMA), CDMA, WCDMA, Orthogonal FDMA (OFDMA), Interleaved FDMA (IFDMA), Discrete Fourier Transform (DFT) spread OFDMA (DFT OFDMA), Spatial Division Multiple Access (SDMA), or combinations thereof, for example.

A BS 102-104, which also may be referred to as "node" or "access point," is a multiple-channel, two-way, wireless communication apparatus that forms a portion of the infrastructure of network 100. A BS 102-104 is adapted to provide a communication interface between wireless devices 110-112 and other network nodes (e.g., other BSs and/or a base station controller). A BS 102-104 may be installed at a fixed location, in some cases, or may form a portion of a movable installation. A BS 102-104 may include, for example, one or more antennas, one or more sets of transceivers, digital signal processors, and control electronics, among other things. BSs 102-104 may be connected together and/or to one or more base station controllers (not illustrated) via wired or wireless interconnections (not illustrated). A base station controller, in turn, may be connected to a public switched telephone network (PSTN) (not illustrated) or other network.

A group of BSs 102-104 together service a network of cells within which information may be exchanged with wireless devices 110-112. In an embodiment, a BS 102-104 may include multiple sector transmitters, and accordingly may provide service within multiple cell "sectors" 120, 121, 122. For example, as illustrated in FIG. 1, each BS 102-104 may include three sector transmitters, thus providing service within three sectors 120-122. In FIG. 1, the sectors 120-122 that are serviced by a particular base station 102-104 are denoted with the same reference number. Although network 100 illustrates three sectors 120-122 associated with each BS 102-104, each BS 102-104 may service a different number of sectors (e.g., one, two, four or more). A group of sectors (e.g., sectors 120) provided by a single BS (e.g., BS 102) may be referred to as a "cell," although the term "cell" sometimes is used synonymously with "sector."

Sectors 120-122 represent geographical areas covered by a BS's antenna system. For explanation purposes only, sectors 120-122 are modeled as having a hexagonal sector-edge outer boundary. A sector 120-122 may be modeled as having a differently shaped outer boundary. In reality, a sector-edge outer boundary may not accurately be definable using a regular geometric pattern. Instead, a sector-edge outer boundary may be defined as a continuum of points where the BS antenna system's ability to provide coverage falls below a given low signal threshold (e.g., −106 dBm), for example. Because the communication environment and conditions continuously may change, a sector-edge outer boundary may change dynamically. In addition, adjacent sectors 120-122 physically may overlap each other, to some extent.

Wireless devices 110-112 may include wireless communication apparatus, which may transmit and/or receive information over an air interface or other wireless communication medium. In an embodiment, wireless devices 110-112 include receivers that are designed to take advantage of macro-diversity by simultaneously receiving multiple radio links from multiple BSs 102-104, and performing selection combining and/or soft combining of the signals. Wireless device 110 may be a device selected from a group of device types that includes, but is not limited to, cellular telephones, radios, computers, personal data assistants (PDAs), pagers, and wireless personal area network (WPAN) compatible devices, and other types of wireless communication apparatus, for example.

Information is conveyed between BSs 102-104 and wireless devices 110-112 over uplink and downlink channels, a set of which are provided within each sector 120-122. A "downlink channel" may refer to a channel in which information is conveyed from a BS 102-104 to a wireless device 110-112, in an embodiment. Conversely, an "uplink channel" may refer to a channel in which information is conveyed from a wireless device 110-112 to a BS 102-104. A channel may be defined by a specific carrier frequency, scrambling code, channelization code, start time, and stop time, for example.

During a communication session between the network 100 and a wireless device 110-112, the network 100 may allocate one or more channels to the wireless device 110-112. As used herein, the term "communication session" may mean a sequence of related message exchanges between a wireless device 110-112 and the network 100. When a wireless device 110-112 attempts to initiate a communication session, a determination is made as to which base station 102-104 initially will allocate a channel to the wireless device 110-112, and regarding within which sector 120-122 the allocated channel will be provided. This determination may depend, at least in part, on the strength of signals from within one or more sectors 120-122, as measured by the wireless device 110-112. This signal strength is referred to herein as a "received signal strength" or "RSS." For example, a wireless device, such as wireless device 110, may receive detectable signals within multiple sectors 120-122 from multiple base stations 102-104, as indicated by arrows 130, 131, 132. Assuming that a channel is available to allocate, the network 100 may determine that the wireless device 110 will be allocated a channel within a sector 120-122 having a signal with the highest RSS.

When a wireless device 110-112 moves with respect to a base station 102-104, the RSS associated with the current channel (e.g., the channel over which the wireless device 110-112 currently is communicating) may vary substantially. The RSS may be affected by factors other than relative movement, as well. In some cases, the RSS may fall to a level at which reliable communications over the channel may not be maintained, thus resulting in a connection failure. In cellular telephony terms, this is more commonly referred to as a "dropped call." In some cases, prior to an impending connection failure, the network 100 may be able to perform a handoff process, in which the wireless device 110-112 is allocated another channel provided within another sector 120-122. This may enable the communication session to continue uninterrupted. In other cases, another reliable channel may not be available, and the connection failure may result. A handoff may occur between adjacent sectors (e.g., two sectors 120) of a single base station (e.g., base station 103), or between adjacent sectors (e.g., between a sector 120 and a sector 121) provided by different base stations (e.g., base station 103 and 104). The former type of handoff may be referred to as an intra-cell handoff, and the latter type of handoff may be referred to as an inter-cell handoff.

Figure 2:
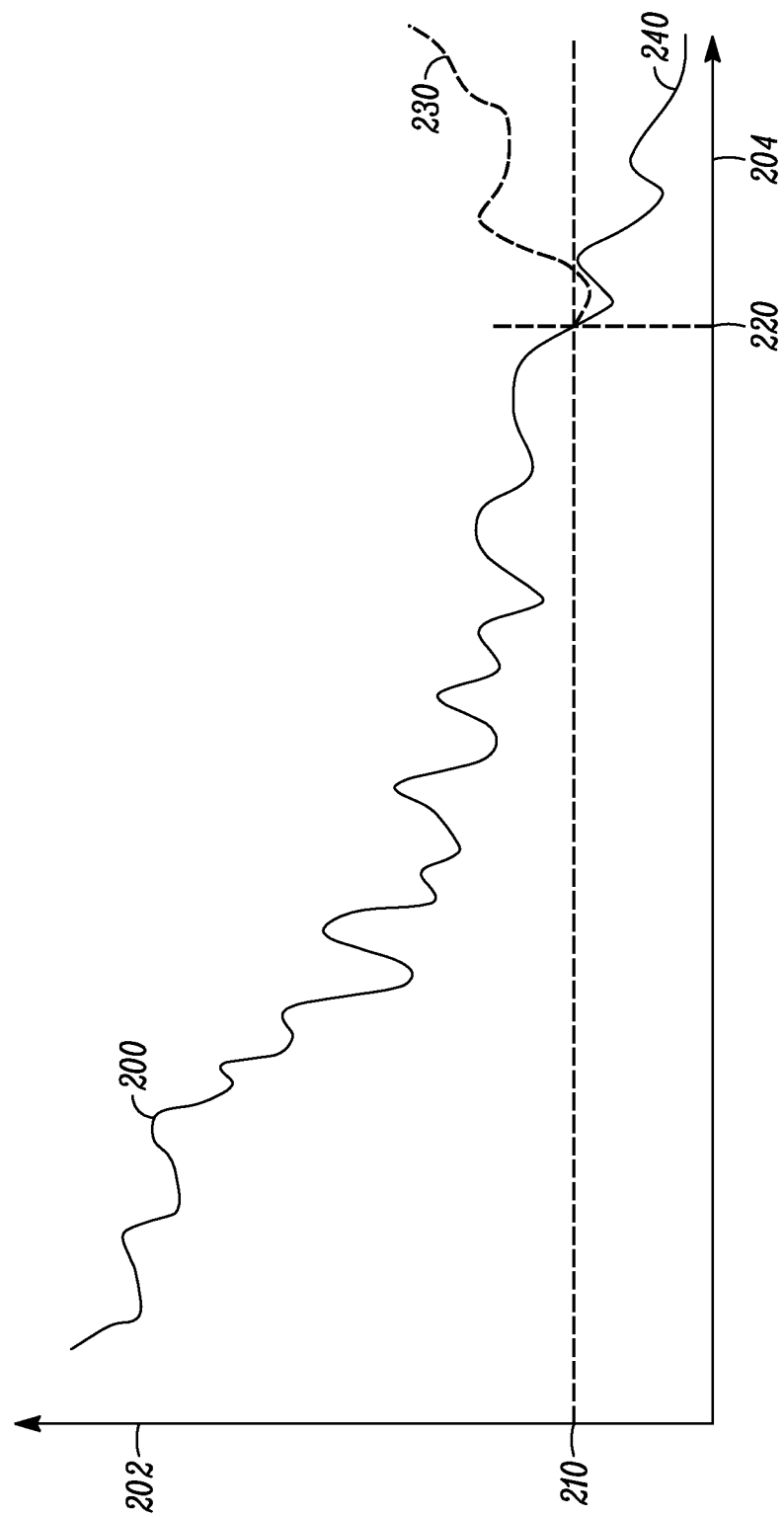
FIG. 2 illustrates an example of a plot of received signal strength versus time.

FIG. 2 illustrates an example of a plot 200 of RSS versus time. Axis 202 represents RSS, and axis 204 represents time. In an embodiment, RSS may be measured in decibels (dBm), for example, or some other power unit. In an alternate embodiment, RSS may be indicated in terms of a bit error rate (BER) or some other indicator of received signal quality.

During normal operations, the RSS for the channel over which the wireless device is communicating is measured periodically at a pre-determined measurement frequency (e.g., every 10 seconds). A pre-determined, triggering RSS threshold 210 may be defined, which corresponds to an RSS measurement below which a connection failure is likely to result (e.g., the connection failure is imminent). For example, in an embodiment, a triggering RSS threshold 210 may be specified as −106 dBm, although the triggering RSS threshold 210 may have other values, in other embodiments. When an RSS is measured in BER, a triggering RSS threshold also may be specified as a BER.

Plot 200 indicates that, as time increases, the RSS of a measured signal generally is decreasing. At a time 220, the RSS has reached the triggering RSS threshold 210. In an embodiment, as will be described in more detail below, once the RSS has reached or transcended the triggering RSS threshold 210, the wireless device may prompt the user regarding whether the user would like the wireless device to perform an alternate RSSI process. When the user indicates that the user would like the wireless device to perform the alternate RSSI process, the wireless device may perform one or more processes that may better help the user to find a position or physical area where an RSS may be higher.

Dashed plot line 230 illustrates a general improvement in RSS after time 220, which represents a potential RSS improvement that may be achieved when the wireless device performs the alternate RSSI process. This improvement in the RSS may preclude a connection failure, and/or may increase the likelihood that the wireless device may establish a new connection. Solid plot line 240 illustrates a continued deterioration in RSS after time 220, which represents a potential RSS deterioration that may occur when the wireless device does not perform the alternate RSSI process. Such deterioration in the RSS may result in a connection failure, and/or may preclude the wireless device from establishing a new connection.

During operation, a wireless device may provide an indicator of the RSS. This indicator is referred to herein as an "RSS indicator" or "RSSI." An RSSI may be provided as an element of a device display, in an embodiment. The state of the RSSI may indicate whether an RSS is high, medium or low, during any given time period.

Figure 3:
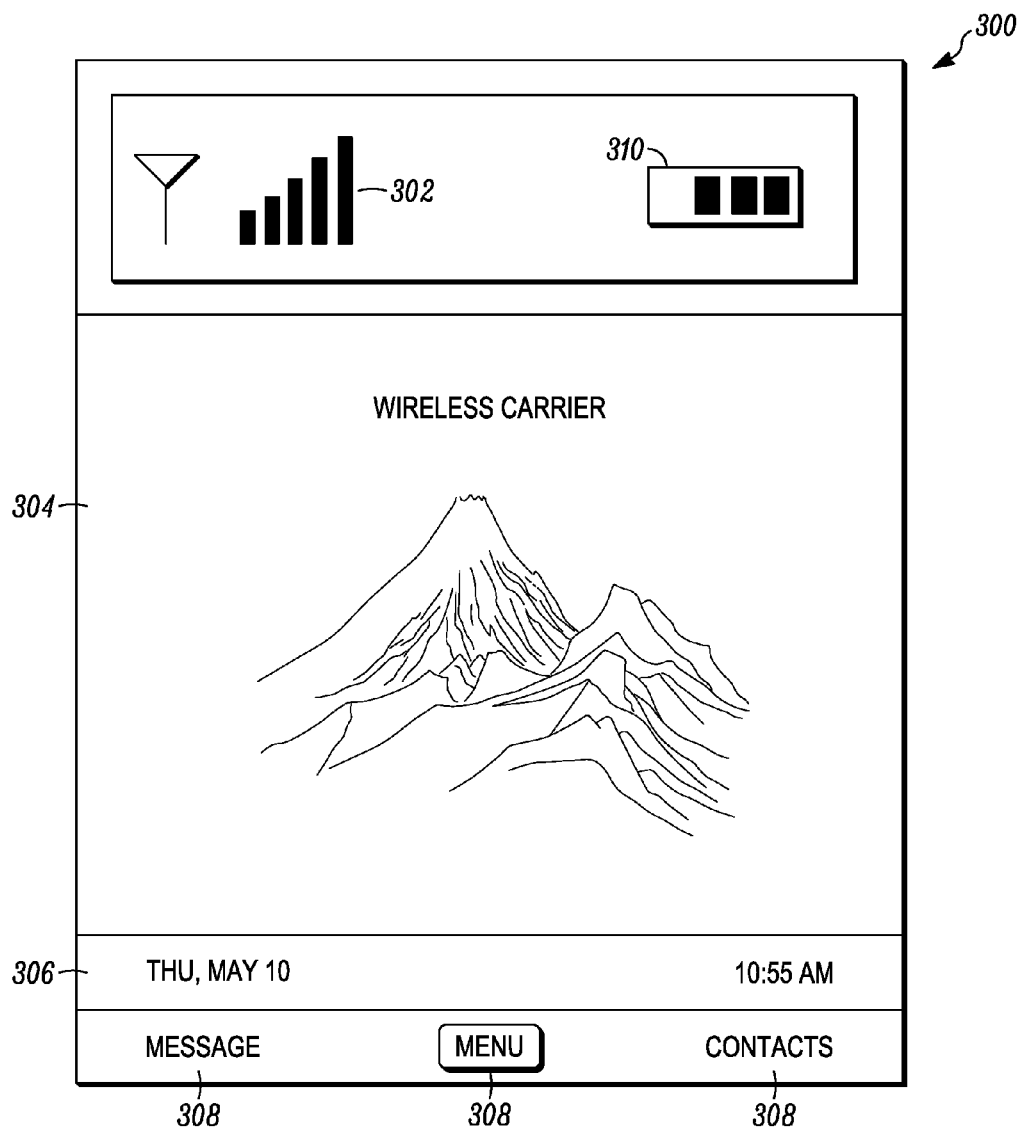
FIG. 3 illustrates an example of a device display having a received signal strength indicator (RSSI), in accordance with an example embodiment.

FIG. 3 illustrates an example of a device display 300 having an RSSI 302, in accordance with an example embodiment. Device display 300 may correspond to a cellular telephone display, for example. Other device displays may be adapted to correspond to other types of wireless devices. It is to be understood that the example device displays illustrated in FIG. 3 and other FIGS. of the present application are included for the purpose of introducing and illustrating certain concepts that are relevant to the inventive subject matter. The example device displays are not intended to limit the scope of the inventive subject matter to cellular telephones.

Device display 300 forms a portion of a graphical user interface, and may include multiple distinct display fields and/or display elements. For example, device display 300 may include an RSSI 302, a main field 304, a time/date field 306, user input prompts 308, and a battery charge indicator 310, in an embodiment. The main field 304 may include displayed elements such as a wireless carrier identifier and a background image, as illustrated. At various times, the main field 304 also or alternatively may include other displayed elements, such as a telephone number, caller identification information, text, images, video, menu items, contact lists, input fields, alerts, and prompts, to name a few types of elements. The time/date field 306 may include displayed information regarding a current time and/or date. User input prompts 308 may include displayed elements that identify user-selectable options (e.g., "display messages," "open the main menu," "open the contacts list," "exit," and so on), where each displayed element may be in proximity to (e.g., above) a keypad key which, when pressed, causes the corresponding option to be executed.

RSSI 302 may dynamically indicate the approximate RSS of a channel, such as a control channel, when a communication session is not in progress, or a channel over which the wireless device currently is communicating, when a communication session is in progress. RSSI 302 may be represented using a variable number of "bars" or other indicia. For example, RSSI 302 includes five bars, in the state illustrated in FIG. 3. When an RSS is very high, a maximum number of bars may be displayed, and when the RSS is very low, a minimum number of bars (or zero bars) may be displayed. As will be explained in more detail later, various RSSI determination parameters may be used in producing RSSI 302. For example, "default" RSSI determination parameters may be used in producing a default RSSI during normal operations, and "alternate" RSSI determination parameters may be used in producing an alternate RSSI during an alternate RSSI process.

Observation of the RSSI 302 may enable a user to determine whether an RSS may be degrading to a point where a connection failure is likely to occur. In addition, during the process of attempting to establish a communication session, a user may observe the RSSI 302 to determine whether the RSS is likely to be adequate to support a connection with the network. When a user observes that the RSSI 302 indicates a low signal, the user may attempt to relocate the telephone to an area in which a higher RSS is present. However, an RSSI 302 produced using default RSSI determination parameters may introduce a significant amount of delay in accurately reflecting the actual RSS at any given location or position, as will be discussed in more detail later. When a user rapidly moves a wireless device in an attempt to find the presence of a higher power received signal, the user may become frustrated with the inaccuracy of the RSSI 302.

As will be explained in more detail later, a wireless device may be adapted to recognize when an RSS may be low (e.g., inadequate to support a communication session), and to prompt the user regarding performance of an "alternate received signal strength indication (RSSI) process," in an embodiment. While performing the alternate RSSI process, alternate RSSI determination parameters may be used in producing the RSSI, in an embodiment. An RSSI produced using the alternate RSSI determination parameters may more accurately approximate a real-time value of the RSS. In another embodiment, a wireless device may alter the appearance of the RSSI, while performing the alternate RSSI process, as will also be explained in more detail later. Embodiments of methods for a wireless device to perform these processes are described in detail in conjunction with FIGS. 4-8.

Figure 4:
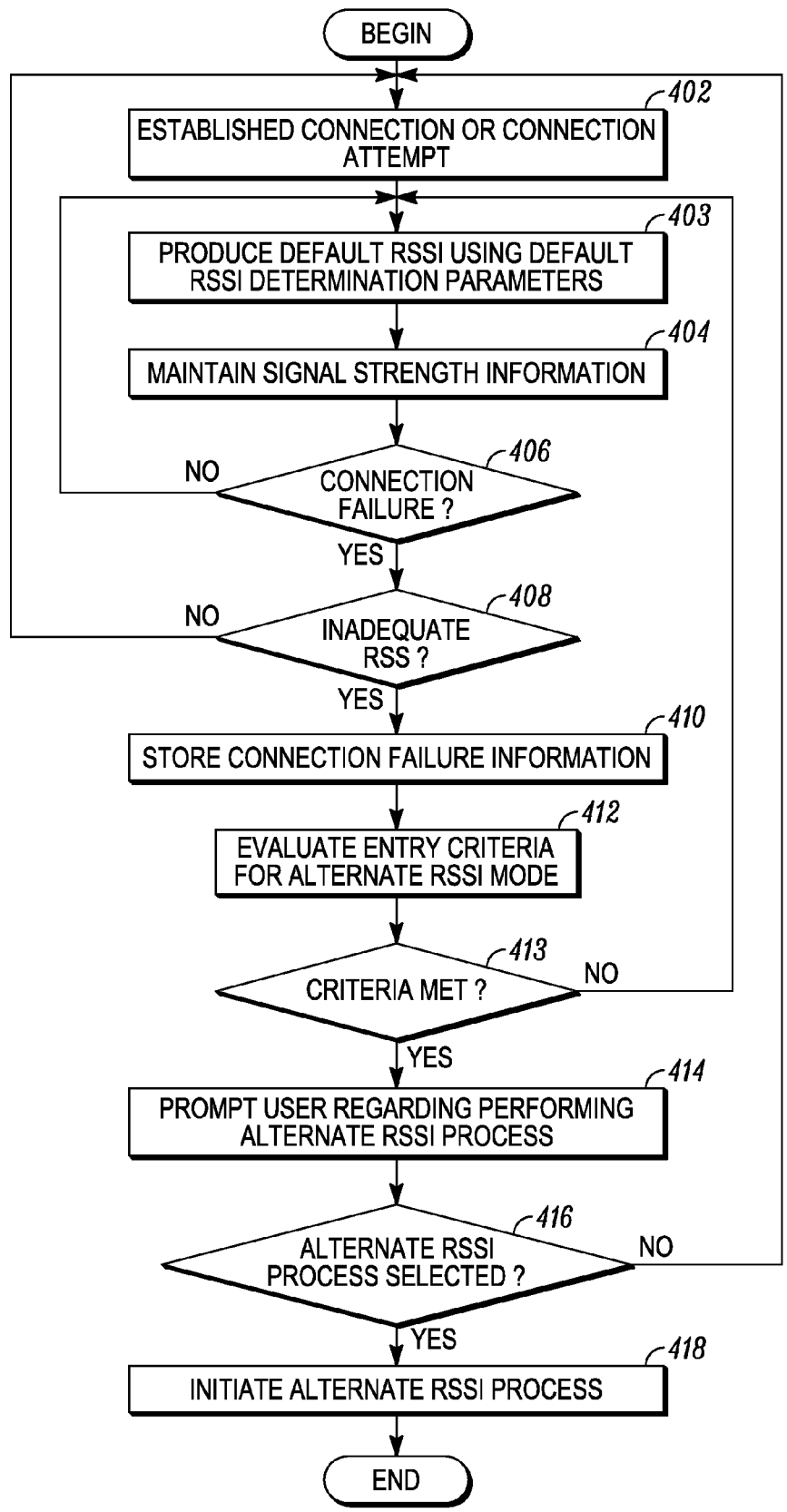
FIG. 4 illustrates a flowchart of a method for prompting a user regarding performing an alternate RSSI process, in accordance with an example embodiment.

FIG. 4 illustrates a flowchart of a method for prompting a user regarding performing an alternate RSSI process, in accordance with an example embodiment. The method may be performed by a wireless device (e.g., wireless device 110, FIG. 1). In an embodiment, the method may begin, in block 402, when a connection between the wireless device and the wireless network already is established (e.g., a communication session is ongoing). In this case, the wireless network already has allocated a channel to the wireless device, and the wireless device may be engaged in active communication over the channel with the wireless network. Alternatively, the method may begin in-between communication sessions, such as when the wireless device attempts to establish a connection with the wireless network.

In either situation, in block 403, a default RSSI (e.g., RSSI 302, FIG. 3) may be produced, using default RSSI determination parameters. The default RSSI may be displayed on a device display (e.g., device display 300, FIG. 3), to help a user to assess the RSS in the area in which the user is located. In order to reduce erratic fluctuations in a default RSSI (e.g., RSSI 302, FIG. 3), a wireless device may produce a default RSSI based on default RSSI determination parameters, as mentioned briefly above. For example, a default RSSI determination parameter may include a default RSS measurement frequency. The default RSS measurement frequency may be a relatively slow frequency. For example, a default RSS measurement frequency may be a frequency in a range of about one RSS measurement every 10-15 seconds, although different default RSS measurement frequencies may be employed. In addition, another default RSSI determination parameter may include a type of function used to determine the default RSSI, which may be referred to herein as a default RSSI determination function. For example, a default RSSI determination function may be a function of multiple RSS measurements (e.g., an average, mean, or median value of a default number (greater than one) of RSS measurements). As a more specific example, a default RSSI determination function may include an average of a default number of RSS measurements (e.g., five or more).

During a communication session and between communication sessions, the wireless device may maintain current signal strength information, in block 404, for one or more base stations. The one or more base stations may include, for example, the base station with which the wireless device currently is connected (if any), and one or more other base stations having signals that are receivable by the wireless device. The one or more other base stations (e.g., the base stations with which the wireless device is not currently connected) may include one or more handoff candidates, in an embodiment. A base station may be considered a handoff candidate, for example, when the base station meets pre-defined proximity criteria, signal strength criteria, and/or other criteria. For example, a base station may meet pre-defined proximity criteria when the base station provides communication channels within a cell (or sector) that is adjacent to or otherwise in proximity to the cell (or sector) within which the wireless communication device currently is located, in an embodiment. A base station may meet pre-defined signal strength criteria when an RSS of a control channel and/or communication channel supported by the base station is at or above a pre-defined signal strength threshold. In other embodiments, although a base station currently may not meet pre-defined proximity criteria and/or signal strength criteria, the base station may be considered to be a handoff candidate when the base station previously met either or both criteria within some pre-defined prior period of time (e.g., within the last 60 minutes or some other time period). Along with maintaining current signal strength information, the wireless device may maintain historical signal strength information, in an embodiment, such as signal strength information for base stations having signals that were receivable by the wireless device, in the past, but which are not currently receivable.

Signal strength information may be maintained, for example, in a table or other data structure. In an embodiment, a table of signal strength information may include multiple records, where each record may include a base station identifier (ID), a signal strength indicator, a measurement time, and connection status and/or history information. Table 1 illustrates an example of such a table:

TABLE 1

Signal Strength Information Table

| Base Station ID | Signal Strength Indicator | Measurement Time | Connection Status/History |
|---|---|---|---|
| 102 | −56 dBm | 10:55:54 | not connected, history |
| 103 | −40 dBm | 10:55:59 | currently connected, history |
| 104 | −104 dBm | 10:56:06 | not connected, history |

For purposes of simplicity and explanation only, the base station ID values correspond to reference numbers in FIG. 1. In actuality, the base station ID values may correspond to the base station identifier system defined by the wireless network. The signal strength indicator field may include, for example, a value representing a last measured signal strength for a control channel and/or another channel (e.g., a channel over which the wireless device is communicating). In other embodiments, the signal strength indicator field may include a value derived from multiple previous signal strength measurements. In addition, although the signal strength values are represented in dBm in the table, the signal strength may also or alternatively be represented as a BER or another indicator of signal strength, in other embodiments. The measurement time may correspond to a time when a signal strength measurement was taken and/or when the signal strength indicator was derived. In an embodiment, a single signal strength indicator and measurement time may be maintained for each base station ID. In an alternate embodiment, multiple signal strength indicators and/or measurement times may be maintained for each base station ID.

The connection status and/or history information field, which alternatively may be represented in multiple fields, may include an indicator of whether or not the wireless device currently has an established connection with the corresponding base station (e.g., the base station has allocated a channel to the wireless device, and the wireless device is communicating over that channel). In addition, this field may include historical information regarding whether or not the wireless device, in the past, had a connection with the base station, how many previous connections had been established, when any previous connections had been established, terminated, and/or failed (referred to below as "connection failure information," previous signal strength indicators, and/or other information regarding connections with and/or signals from the corresponding base station). Although various fields are included in each record in Table 1, more, fewer or different records may be included in a table, in other embodiments. In addition, although three records are included in Table 1, a table may include more or fewer records, and the number of records may be fixed or variable.

Referring again to FIG. 4, a determination may be made whether a connection failure has occurred or is imminent, in block 406. When a connection failure has not occurred and/or is not imminent, the method iterates as shown. A connection failure may occur, for example, when the wireless device determines that a termination of an ongoing communication session has occurred. In other words, a wireless device may determine that it is unable to continue communications with the wireless network, resulting in the termination of an ongoing communication session. A connection failure may be considered to be imminent, for example, when the wireless device determines that the RSS of a channel over which the wireless device is communicating has reached or transcended an "imminent failure RSS threshold" (e.g., a power or BER threshold). As used herein, the term "transcend" means to cross over an RSS threshold from a condition of a relatively high signal strength to a condition of a relatively low signal strength. Whether the term "transcend" means to fall below a threshold or to exceed a threshold depends on the type of measurement units in which the RSS and the threshold are specified. For example, when an imminent failure RSS threshold is specified as a power measurement (e.g., −106 dBm, although other values may be specified), a connection failure may be considered to be imminent when the wireless device determines that the RSS has reached or fallen below the imminent failure RSS threshold. As another example, when an imminent failure RSS threshold is specified as a BER measurement, a connection failure may be considered to be imminent when the wireless device determines that the BER has reached or exceeded the imminent failure signal strength threshold.

As used herein, the term "connection failure" may include the termination of an ongoing communication session due to inadequate signal conditions and/or the inability of a wireless device to establish a new connection with the wireless network. For example, the latter type of connection failure may occur when the wireless device has made an unsuccessful attempt to initiate a new communication session with the network. In either case, a connection failure may be the result of one or more precipitating factors. For example, a connection failure may occur due to low RSS, noise or other interference (e.g., multi-path effects), power interruptions, wireless device malfunctions, and/or other factors.

When a connection failure has occurred or is imminent, a determination may be made, in block 408, whether the connection failure or imminent connection failure may be due to an "inadequate" RSS. When the connection failure or imminent connection failure is not due to an inadequate RSS, the method iterates as shown. Determining that an RSS is inadequate may include determining that the RSS does not meet one or more conditions. In an embodiment, for example, the wireless device may determine that an RSS is "inadequate" when an RSS from a base station with which the wireless device is (or was) communicating has reached or transcended a "triggering RSS threshold" (e.g., triggering RSS threshold 210, FIG. 2), in an embodiment. In addition, when a connection failure has occurred or when the wireless device has been unable to establish a connection, the wireless device may determine that an RSS is inadequate when one or more RSSs from one or more control channels (or other channels) from one or more base stations are at, below (in the case of power) or above (in the case of BER) the triggering RSS threshold. The triggering RSS threshold may or may not be specified to have the same value as the imminent failure RSS threshold, described above.

When a determination is made that a connection failure occurred due to an inadequate RSS, and when the connection failure corresponds to a terminated communication session, then in block 410, connection failure information may be stored. In an embodiment, the connection failure information may be stored, for example, in a record of a table or other data structure, such as in the connection status/history field of Table 1, above. Connection failure information may include, for example, information regarding a time of the connection failure. Block 410 may be bypassed, in some situations, such as when a connection failure is imminent and/or when a connection failure relates to an inability to connect to the network, and not from a terminated communication session.

In block 412, various entry criteria may be evaluated to determine whether the wireless device should prompt the user regarding performing an alternate RSSI process. For example, a criteria for performing the alternate RSSI process may be that a connection failure is imminent or that a connection failure resulted in the termination of a communication session. As another example, a criteria may be that a threshold number of ongoing communication session terminations (e.g., call drops) have occurred. For example, the threshold number of communication session terminations may be a pre-defined integer number from one to five, although other values may be specified (e.g., any integer number from 1 to infinity). As still another example, a criteria may be that a threshold number of unsuccessful attempts to initiate a new communication session have occurred. For example, the threshold number of unsuccessful attempts may be a pre-defined integer number from one to five, although other values may be specified (e.g., any integer number from 1 to infinity). When a determination is made, in block 413, that the entry criteria have not been met, the method may iterate as shown.

When the criteria have been met, then in block 414, the wireless device may provide a prompt to the user regarding performing an alternate RSSI process. For example, the wireless device may produce one or more display prompts, which inform the user of the option to perform the alternate RSSI process. In addition, the wireless device may provide one or more prompts, which indicate how the user may specify the user's desire for the wireless device to perform the alternate RSSI process or not.

Figure 5:
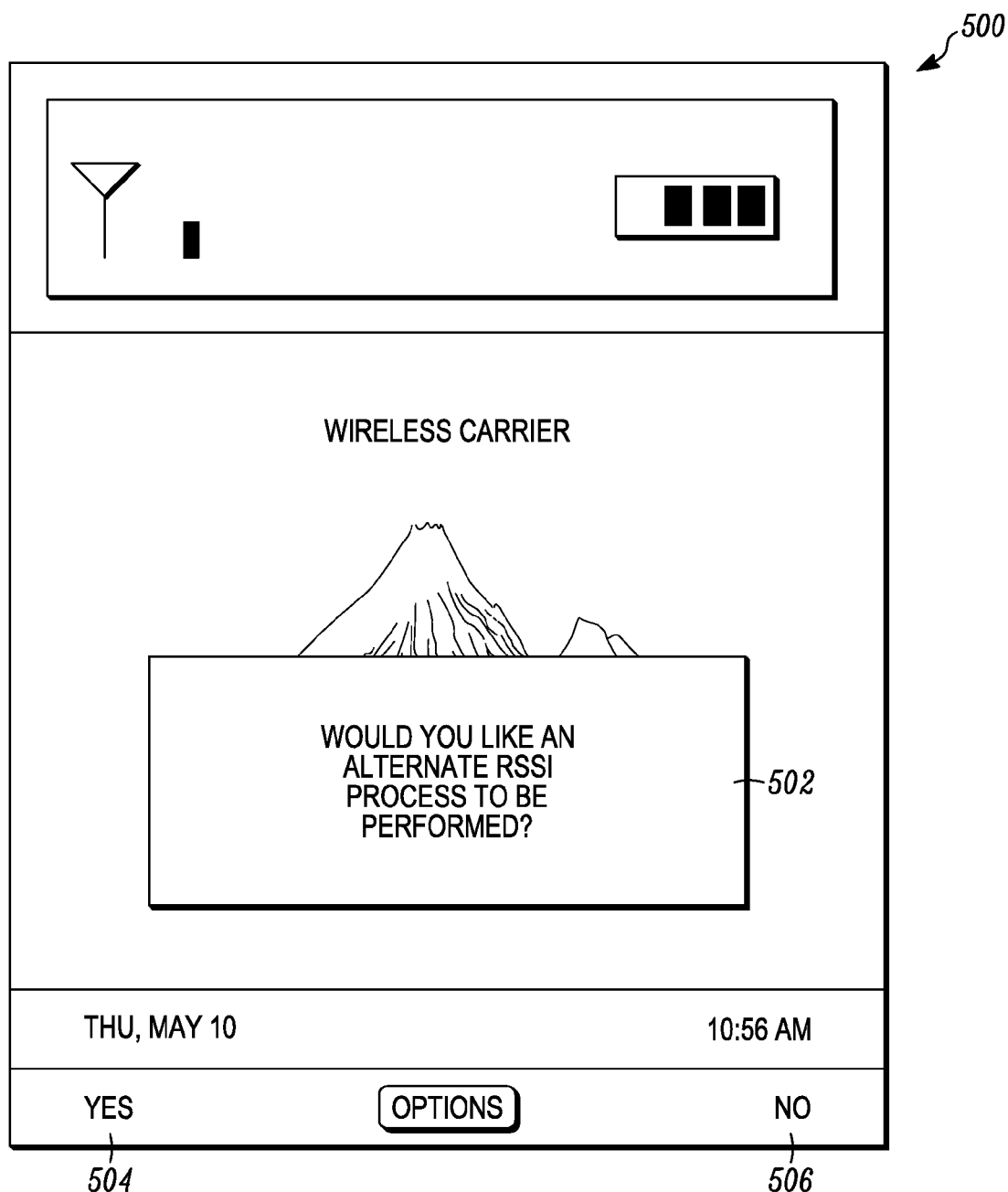
FIG. 5 illustrates an example of a device display with a display prompt regarding performing an alternate RSSI process, in accordance with an example embodiment.

FIG. 5 illustrates an example of a device display 500 with a display prompt 502 regarding performing an alternate RSSI process, in accordance with an example embodiment. This display prompt may be referred to herein as an "alternate RSSI process prompt." In the illustrated example, the alternate RSSI process prompt 502 includes a question to the user. More specifically, the alternate RSSI process prompt 502 includes a text query stating: "would you like an alternate RSSI process to be performed?" Other text queries alternatively could be provided, such as a more colloquial question: "would you like to search for a better signal?" In addition, in conjunction with alternate RSSI process prompt 502, the wireless device may provide an affirmative prompt 504, displayed in proximity to a button that the user may press to initiate the alternate RSSI process, and/or a negative prompt 506, displayed in proximity to another button that the user may press to refuse the option of performing the alternate RSSI process. In alternate embodiments, an alternate RSSI process prompt may be an audio prompt, and/or the wireless device may be adapted to process a verbal indication (e.g., a spoken "yes" or "no") from the user regarding whether or not the user desires the wireless device to perform the alternate RSSI process. In still another embodiment, a user may be able to initiate the alternate RSSI process on the user's own volition, such as by providing a number of user inputs to select an option (e.g., a menu option) for performing the alternate RSSI process.

Referring back to FIG. 4, a determination may be made, in block 416, whether the user has selected an option of invoking the wireless device to perform an alternate RSSI process. This determination may be made, for example, by evaluating whether a user input (e.g., a button press) corresponds to an affirmative selection or a negative selection. When a negative prompt selection has been made, or when some other prompt exit event occurs (e.g., a timeout occurs or the RSS improves to an acceptable value), then a determination may be made that the user has not selected initiation of the alternate RSSI process, and the method may iterate as shown. When an affirmative selection has been made, then the wireless device may proceed to initiate the alternate RSSI process, in block 418, and the method may end. In an alternate embodiment, performance of an alternate RSSI process automatically may occur when particular conditions are present and/or when particular events have occurred, rather than being initiated in response to an affirmative selection by a user. Performance of the alternate RSSI process will be described in detail in conjunction with FIG. 6.

Figure 6:
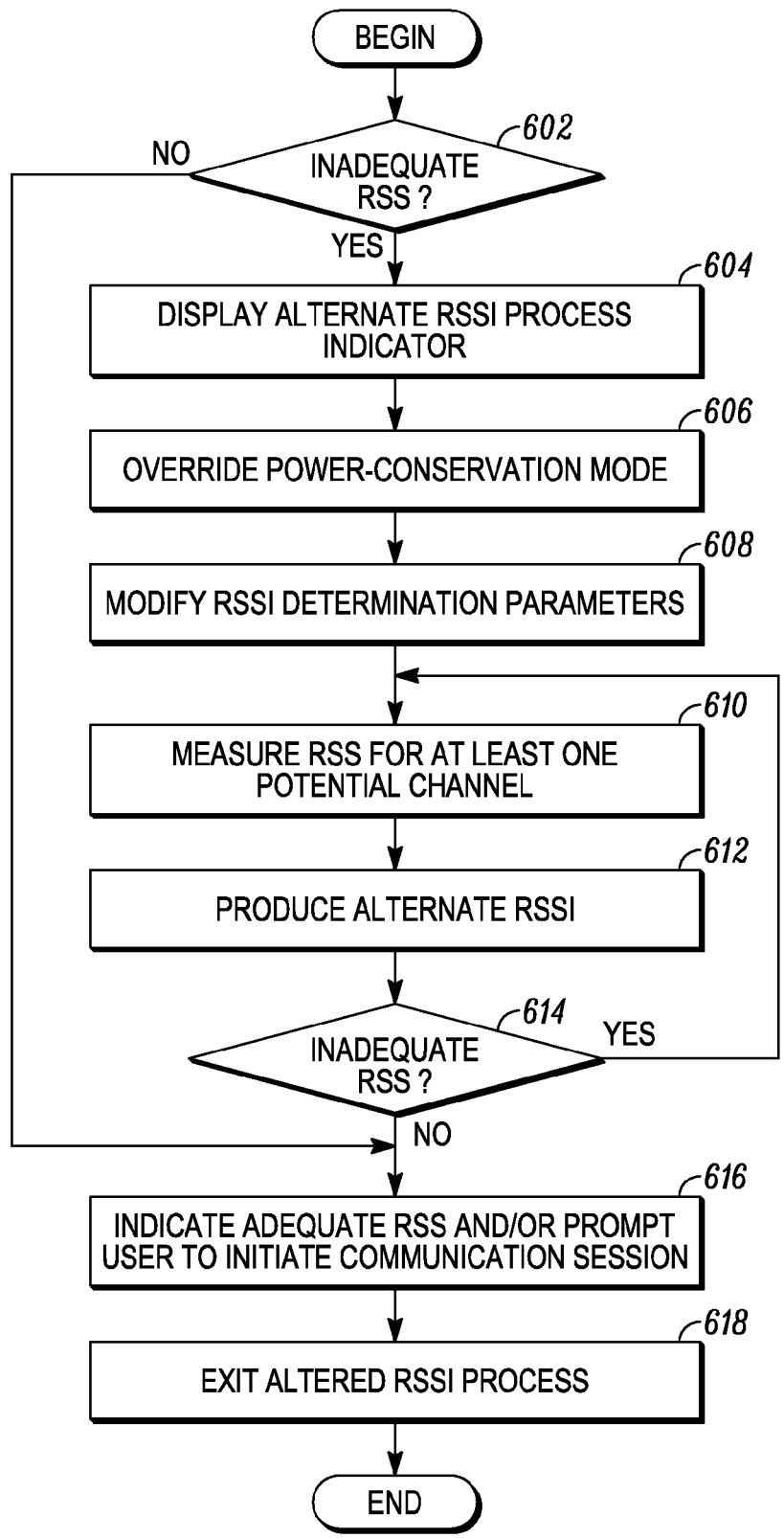
FIG. 6 illustrates a flowchart of a method for initiating and executing an alternate RSSI process, in accordance with an example embodiment.

FIG. 6 illustrates a flowchart of a method for initiating and executing an alternate RSSI process, in accordance with an example embodiment. The method of FIG. 6 may be invoked, for example, when user inputs have been received to invoke the wireless device to perform the alternate RSSI process or when the wireless device automatically initiated the alternate RSSI process, as is described in the previous paragraph. The method may begin, in block 602, by determining whether an RSS is inadequate. In some cases, this determination may be redundant with the analogous determination in block 408 (FIG. 4), and accordingly the determination may be bypassed. However, when initiation of the method of FIG. 6 occurs without having performed the analogous determination in block 408, the determination may not be redundant, and it may be performed in a manner that is substantially similar to the process described in conjunction with block 408. When an RSS is not inadequate, the method may proceed to block 616, which will be described in more detail later.

Figure 7:
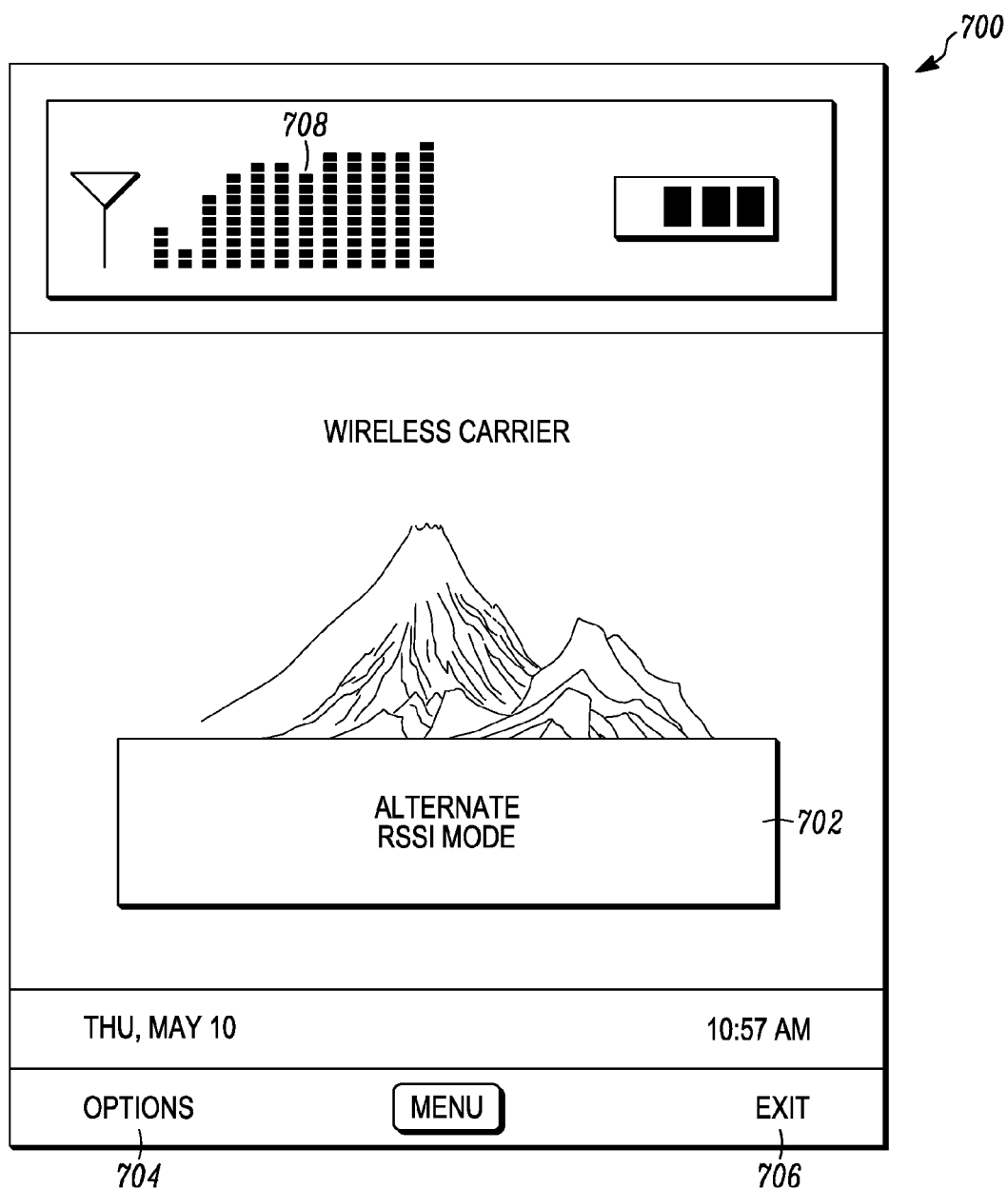
FIG. 7 illustrates an example of a device display with a display element indicating that the wireless device is performing an alternate RSSI process, in accordance with an example embodiment.

When a determination is made that an RSS is inadequate, then in block 604, the wireless device may display an indicator that the wireless device is performing an alternate RSSI process. FIG. 7 illustrates an example of a device display 700 with a display element 702 indicating that the wireless device is performing an alternate RSSI process, in accordance with an example embodiment. Although display element 702 includes a particular example, text indicator (i.e., "alternate RSSI mode"), other text indicators alternatively could be provided.

In addition, in conjunction with display prompt 702, the wireless device may provide one or more prompts, such as an option prompt 704 and/or an exit prompt 706. The option prompt 704 may be displayed in proximity to a button that the user may press to enter an option menu, for adjusting certain parameters regarding performing the alternate RSSI process (e.g., RSS measurement frequency, RSSI style, among other things). The exit prompt 706 may be displayed in proximity to a button that the user may press to cause the wireless device to exit the alternate RSSI process. In alternate embodiments, additional or different prompts may be displayed.

Referring back to FIG. 6, in block 606, the wireless device may override a "power-conservation mode," either by foregoing entry into the power-conservation mode or by exiting the power-conservation mode, if it had been previously entered. A power-conservation mode is a mode that a wireless device may implement in order to avoid unnecessary consumption of battery charge. When a communication session terminates, a wireless device may be adapted automatically to reduce power to certain components in a receive signal processing chain (and/or other components), in order to conserve available power (e.g., battery charge). When the wireless device is in a state in which components of the receive signal processing chain are powered down, the wireless device may be considered to be in the power-conservation mode. While performing an alternate RSSI process, however, some of these receive signal processing chain components may be used to receive and/or process received signals. Accordingly, during the alternate RSSI process, powering down or reducing power to these components may be undesirable, and thus the power-conservation mode may be overridden, in an embodiment. In another embodiment, the power-conservation mode may be only partially overridden or modified so that certain receive signal processing chain components are powered, while power to other components may be reduced or turned off.

In block 608, RSSI determination parameters may be modified, in an embodiment. As mentioned previously in conjunction with block 403 (FIG. 4), RSSI determination parameters may include an RSS measurement frequency and/or various parameters associated with the RSSI determination function (e.g., type of function employed (average, running average, mean, median) and/or the number of RSS measurements included in or incorporated in the RSSI determination function). In an embodiment, the default RSSI determination parameters may be modified in order to more accurately reflect real-time fluctuations in the RSS. For example, a modification to an RSSI determination parameter may include changing the RSS measurement frequency to a frequency that is higher than the default RSS measurement frequency. In an embodiment, for example, an alternate RSSI measurement frequency may be a frequency of at least one RSS measurement per second. In another embodiment, an alternate RSSI measurement frequency may be a frequency of at least one RSS measurement per 0.10 second. A modification to an RSSI determination parameter may also or alternatively include using an RSSI determination function that is different from the default RSSI determination function, where the alternate RSSI determination function produces an RSSI that may more accurately reflect a most recent RSS measurement. For example, an alternate RSSI determination function may include or incorporate fewer than the default number of RSS measurements than the default RSSI determination function. As another example, an alternate RSSI determination function may produce the RSSI based on a single RSS measurement (e.g., a most recent RSS measurement).

In block 610, at least one RSS measurement is made according to the alternate RSSI determination parameters. For example, at least one RSS measurement may be made at an alternate RSS measurement frequency. In an embodiment, RSS measurements may be made for one or more control or communication channels provided by one or more BS. For example, when a communication session is ongoing (e.g., prior to an imminent connection failure), RSS measurements may be made for at least the channel over which the wireless device is communicating. RSS measurements also may be made for at least one control channel (or other channel) provided by at least one BS that may be a handoff candidate.

When a connection failure has occurred, RSS measurements may be made for at least one receivable channel (e.g., a control or communications channel) provided by at least one BS. The wireless device may determine the channels for which it will make RSS measurements based on information included within the signal strength information table (e.g., Table 1, above), in an embodiment. For example, the wireless device may make RSS measurements for channels provided by one or more current or previous handoff candidates and/or for one or more BS with which the wireless device communicated in the past. The RSS measurements may be used to update information within the signal strength information table, in an embodiment.

In block 612, the wireless device may produce an RSSI corresponding to one or more of the RSS measurements made in block 610, in an embodiment. When a communication session is ongoing, the RSS measurements used to produce the RSSI may be RSS measurements for the channel over which the wireless device is communicating. When a communication session is not in progress, the RSS measurements used to produce the RSSI may be RSS measurements for a receivable channel (e.g., a control or communications channel). For example, the RSS measurements used to produce the RSSI may be RSS measurements for a receivable channel having the highest RSS (e.g., a channel provided by one of multiple BS having signals that are receivable by the wireless device).

In order to produce an RSSI, the wireless device may determine an RSSI value, which is based on the RSSI determination function being implemented at the time and the selected RSS measurements. In an embodiment, the RSSI determination function may be an RSSI determination function that is different from the default RSSI determination function, as described previously in conjunction with block 608. In an alternate embodiment, the RSSI determination function may be the default RSSI determination function, although, when a alternate RSS measurement frequency is being implemented, the default RSSI determination function may produce a different result from that which would be produced when a default RSS measurement frequency is being implemented.

When an RSSI value is determined, the RSSI value may be converted into display commands, and an alternate RSSI may be produced in accordance with the display commands, in an embodiment. In an embodiment, an alternate RSSI may have a substantially similar format to a default RSSI produced outside of the alternate RSSI process, such as the format of default RSSI 302 (FIG. 3). In another embodiment, a wireless device also or alternatively may produce an alternate RSSI may include an "increased resolution" RSSI. For example, an increased resolution RSSI may include more "bars" or other indicia, which reflect the RSS to a finer granularity (e.g., each bar may represent a smaller range of RSS values than the bars for the default RSSI (e.g., RSSI 302, FIG. 3)). In addition or alternatively, an increased resolution RSSI may be adapted to indicate an RSS that is too low to be indicated by a default RSSI (e.g., the default RSSI would produce zero bars). Referring again briefly to FIG. 7, an example of an increased resolution RSSI 708 is illustrated.

In addition to or in lieu of producing the RSSI as a display element, the wireless device may produce an RSSI in one or more other formats. For example, an RSSI may be produced in the form of an audible signal (e.g., a sequence of sounds or a tone having a frequency related to the RSSI values and/or the RSS measurements), a vibration (e.g., a vibration having a frequency or intensity related to the RSSI values and/or the RSS measurements), a display illumination intensity (e.g., a display illumination intensity related to the RSSI values and/or the RSS measurements), a display color (e.g., a display color which changes based on the RSSI values and/or the RSS measurements), and/or the or other types of indicators that may be color, intensity, amplitude, and/or frequency modulated based on the RSSI values and/or the RSS measurements.

In an embodiment, an alternate RSSI is updated through subsequent iterations of blocks 610 and 612. During default operations, the RSSI may be updated at a default RSSI update frequency. The default RSSI frequency may be a frequency equal to or less than the default RSS measurement frequency. In an embodiment, during execution of the alternate RSSI process, an RSS may be measured at an alternate RSS measurement frequency that is faster than the default RSS measurement frequency. In addition or alternatively, an alternate RSSI may be updated at an alternate RSSI update frequency that is faster than the default RSSI update frequency.

Figure 8:
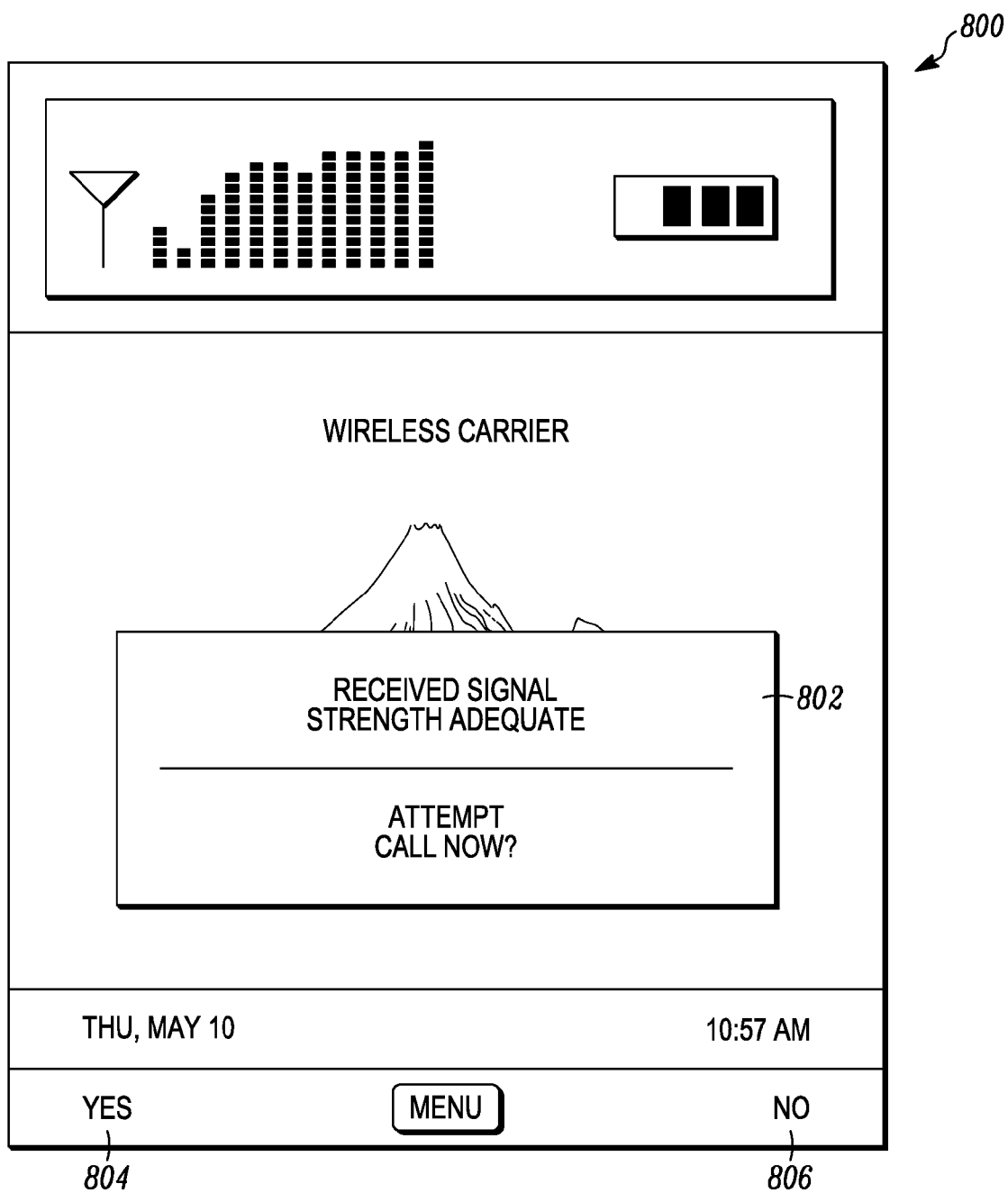
FIG. 8 illustrates an example of a device display with a display element indicating that the RSS is adequate, in accordance with an example embodiment.

A determination is made, in block 614, whether at least one of the most recent RSS measurements indicates that the RSS is inadequate. If the RSS is inadequate, then the method iterates as shown. When the RSS is adequate, then the wireless device may provide an indication to that effect, in block 616, in an embodiment. FIG. 8 illustrates an example of a device display 800 with a display element 802 indicating that the RSS is adequate, in accordance with an example embodiment. In addition, display element 802 includes a prompt to the user to indicate whether the user would like to attempt a call (e.g., a previously attempted call or a dropped call). Although display element 802 includes particular example, text indicators (i.e., "received signal strength adequate" and "attempt call now?"), other text indicators alternatively could be provided.

In addition, in conjunction with display prompt 802, the wireless device may provide one or more prompts, such as an affirmative prompt 804 and/or a negative prompt 806. The affirmative prompt 804 may be displayed in proximity to a button that the user may press to cause the wireless device to attempt to connect with the network (e.g., to initiate a call). The negative prompt 806 may be displayed in proximity to a button that the user may press to cause the wireless device to forego a network connection attempt. In an embodiment, selection of the button associated with the negative prompt 806 also may cause the wireless device to exit the alternate RSSI process. In alternate embodiments, additional or different prompts may be displayed.

Referring again to FIG. 6, the wireless device may exit the alternate RSSI process, in block 618, and return to normal operations (e.g., default operations). In conjunction with returning to normal operations, the wireless device may reset the RSSI determination parameters to the default RSSI determination parameters. In addition, the wireless device may return to displaying a default RSSI. The method may then end.

The sequence of process blocks illustrated in FIGS. 4 and 6 are for example purposes, and are not to limit the scope of the inventive matter only to those process sequences. Instead, it is to be understood that, in alternate embodiments, some or all of the process blocks illustrated in FIGS. 4 and/or 6 may be performed in different orders, may be performed in parallel, may be combined together, may be expanded into multiple sub-processes, and/or may include one or more intermediate processes that are not illustrated. In addition, some of the process blocks may be optionally performed, in various embodiments.

Figure 9:
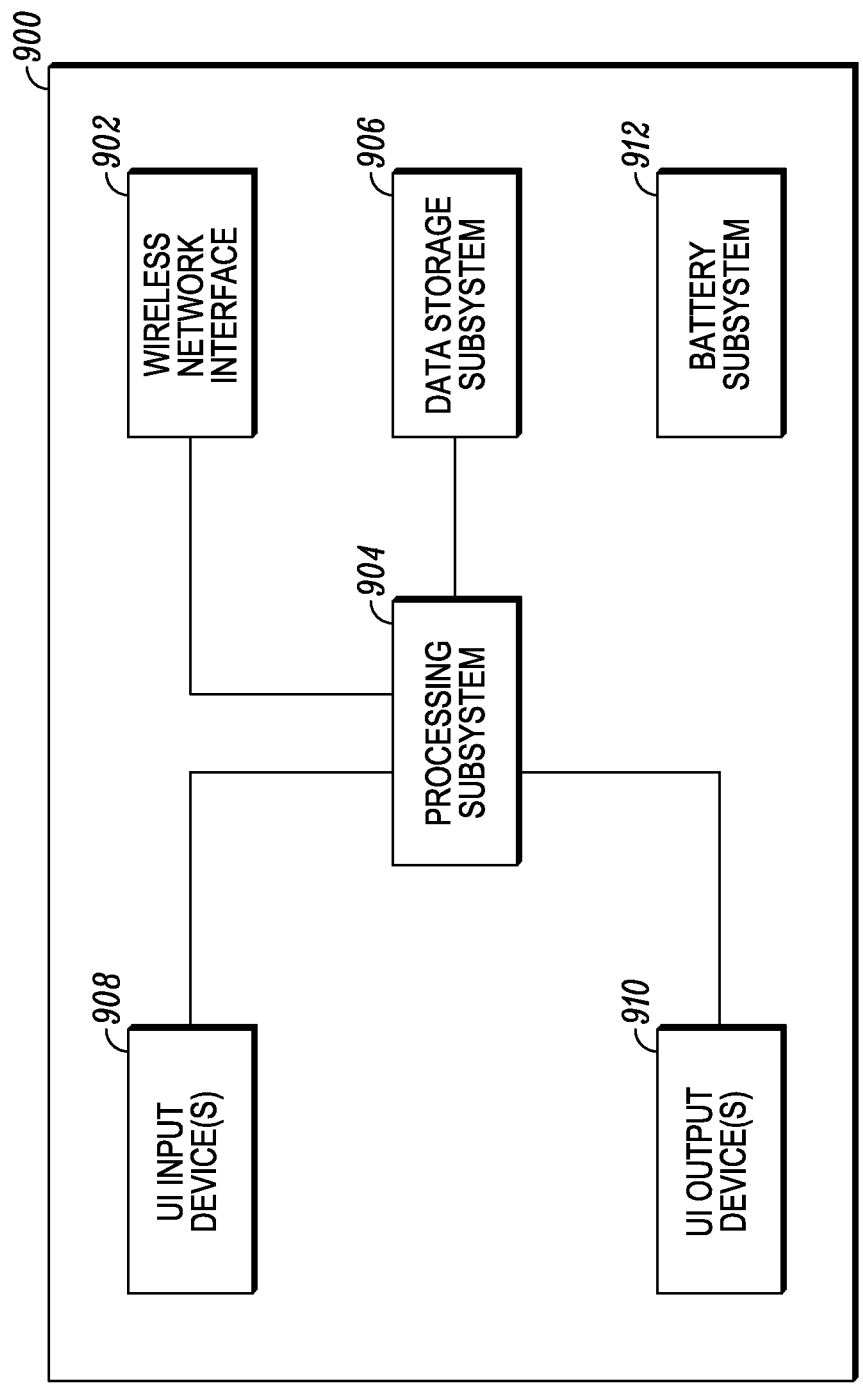
FIG. 9 illustrates a simplified block diagram of a wireless communication device, in accordance with an example embodiment.

FIG. 9 illustrates a simplified block diagram of a wireless communication device 900, in accordance with an example embodiment. Device 900 includes at least one wireless network interface 902, at least one processing subsystem 904, at least one data storage subsystem 906, at least one user interface (UI) input device 908, and at least one UI output device 910, in an embodiment. Device 900 may also include a battery subsystem 912, in an embodiment. In other embodiments, device 900 may include one or more additional or different elements.

Wireless network interface 902 is adapted to receive and/or transmit messages over an air interface. In an embodiment, wireless network interface 902 may include at least one antenna and other apparatus for receiving analog signals from the air interface, and for converting the analog signals into digital data for processing by the at least one processing subsystem 904. Wireless network interface 902 additionally may convert digital data received from a processing subsystem 904 into analog signals for transmission over the air interface by the at least one antenna.

Processing subsystem 904 is adapted to perform various method embodiments, as described previously. Processing subsystem 904 may include at least one processing device (e.g., a general purpose or special purpose processor) and additional circuitry adapted to interface processing subsystem 904 with other elements of device 900. Processing subsystem 904 is operatively coupled to wireless network interface 902, in an embodiment, and accordingly may receive digital data from and provide digital data to wireless network interface 902. The digital data may include, for example, data associated with signals received from a base station over a communication channel and/or a control channel. Processing subsystem 904 also is operatively coupled to UI input device 908 and UI output device 910, in an embodiment, and accordingly may receive information that indicates user inputs, and may provide information (e.g., information for producing one or more RSSIs).

Processing subsystem 904 may store data to and/or retrieve data from the at least one data storage subsystem 906. Data storage subsystem 906 may include, for example, one or more volatile or non-volatile storage components, such as random access memory (RAM), read only memory (ROM), numerous variations of those types of memories, and/or other types of storage. In an embodiment, the at least one data storage subsystem 906 is adapted to maintain information regarding base station IDs, RSS measurements, RSSI values, time information, connection status information, and/or historical information, among other things.

The at least one UI input device 908 may include one or more of various devices selected from a group of UI input devices that includes, but is not limited to a microphone, keypad, keyboard, trackball, pointing device, and/or touchscreen, among other things. In an embodiment, the at least one user input device 908 enables the user to indicate whether or not the user would like the wireless device to initiate (or exit) an alternate RSSI process, as is discussed in detail above.

The at least one UI output device 910 may include one or more of various devices selected from a group of UI output devices that includes, but is not limited to a speaker, display device, touchscreen, mechanical vibration device, and/or indicator light, among other things. In an embodiment, the at least one user output device 910 is adapted to produce one or more RSSI, as is discussed in detail above.

The at least one battery subsystem 912 may be configured to accept at least one rechargeable or disposable battery, in an embodiment, and accordingly may include a battery housing (not illustrated), which may hold the at least one battery. The at least one battery subsystem 912 may be operatively coupled to any one or more of the at least one processing subsystem 904, the at least one data storage subsystem 906, the at least one wireless network interface 902, the at least one user interface input device 908, and/or the at least one user interface output device 910, in an embodiment, in order to provide power to these device elements.

Thus, various embodiments of systems, apparatus and methods for indicating received signal strengths have been described. While the principles of the inventive subject matter have been described above in connection with specific systems, apparatus, and methods, it is to be clearly understood that this description is made only by way of example and not as a limitation on the scope of the inventive subject matter. For example, the illustrated and described embodiments are not meant to preclude operation to cellular telephones. Embodiments of the inventive subject matter could be used in conjunction with other types of wireless networks (e.g., wireless computer networks, radio networks, and other wireless networks having wireless communication devices that communicate over wireless channels with network infrastructure). Further, the phraseology or terminology employed herein is for the purpose of description and not of limitation.

Embodiments of the inventive subject matter may provide certain advantages over traditional systems and methods. For example, embodiments of the inventive subject matter may enable a user to more readily locate areas in which received signal strengths are adequate for robust communications with a wireless network. For wireless device manufacturers, this may result in increased sales due to high user satisfaction, improved connectivity statistics (e.g., dropped calls), and increased customer loyalty. In addition, an enhanced ability for users to place themselves in areas with adequate coverage may result in increased traffic minutes for the wireless carrier.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter, it being understood that various changes may be made in the function and arrangement of elements described in an exemplary embodiment without departing from the scope of the inventive subject matter as set forth in the appended claims and their legal equivalents.

The foregoing description of specific embodiments reveals the general nature of the inventive subject matter sufficiently that others can, by applying current knowledge, readily modify and/or adapt it for various applications without departing from the general concept. Therefore, such adaptations and modifications are within the meaning and range of equivalents of the disclosed embodiments. The inventive subject matter embraces all such alternatives, modifications, equivalents, and variations as fall within the spirit and broad scope of the appended claims and their legal equivalents.

What is claimed is:

1. A method performed by a wireless communication device, the method comprising the steps of:
   producing first received signal strength (RSS) measurements of a base station signal at a first RSS measurement frequency, wherein the first RSS measurement frequency defines a first number of seconds between each of the first RSS measurements;
   displaying a default received signal strength indicator (RSSI) based on the first RSS measurements, wherein the default RSSI indicates a received signal strength of the base station signal;

determining whether the received signal strength has transcended a triggering RSS threshold; and when the received signal strength has transcended the triggering RSS threshold:

provide a user interface prompt to prompt a user of the wireless communication device to indicate that the user would like the wireless communication device to produce an alternate RSSI, wherein providing the user interface prompt is performed in response to determining that the received signal strength has transcended the triggering RSS threshold;

determining whether a user input has been received from the user that indicates that the user would like the wireless device to produce the alternate RSSI;

producing, in response to receiving the user input, second RSS measurements of the base station signal at a second RSS measurement frequency that is greater than the first RSS measurement frequency, wherein the second RSS measurement frequency defines a second number of seconds between each of the second RSS measurements;

displaying the alternate RSSI based on the second RSS measurements, wherein the alternate RSSI more accurately reflects real-time fluctuations in the received signal strength than the default RSSI; and when the user input has not been received, bypassing steps of producing, in response to receiving the user input, the second RSS measurements and displaying the alternate RSSI.

2. The method of claim 1, wherein determining that the received signal strength has transcended the triggering RSS threshold includes determining that a power level of a received signal is at or below a power threshold.

3. The method of claim 1, wherein determining that the received signal strength has transcended the triggering RSS threshold includes determining that a bit error rate of a received signal is at or above a bit error rate threshold.

4. The method of claim 1, further comprising:
receiving at least one user input indicating a user selection for the wireless device to produce the alternate RSSI; and
producing the alternate RSSI in response to the at least one user input.

5. The method of claim 1, wherein producing the alternate RSSI comprises:
updating the alternate RSSI at an alternate RSSI update frequency that is greater than a default RSSI update frequency.

6. The method of claim 1, wherein the default RSSI is produced using a default RSSI determination function, and wherein producing the alternate RSSI comprises:
determining an RSSI value using an alternate RSSI determination function that is different from the default RSSI determination function.

7. The method of claim 1, wherein producing the alternate RSSI comprises:
producing an increased resolution RSSI.

8. The method of claim 1 wherein producing the second RSS measurements and the alternate RSSI comprises:
measuring multiple received signal strengths for multiple received signals; and
producing the alternate RSSI based on a received signal strength measurement for a strongest signal of the multiple received signals, as indicated by the measuring.

9. The method of claim 8, wherein measuring the multiple received signal strengths comprises:
measuring received signal strengths for multiple handoff candidates.

10. The method of claim 1, further comprising:
determining whether the wireless communication device has made an unsuccessful attempt to initiate a new communication session; and when the wireless communication device has made at least one unsuccessful attempt, performing steps of determining that the received signal strength has transcended the triggering RSS threshold and producing the alternate RSSI.

11. The method of claim 1, further comprising:
determining whether a termination of an ongoing communication session has occurred; and
when the termination has occurred, performing the steps of determining that the received signal strength has transcended the triggering RSS threshold and producing the alternate RSSI.

12. The method of claim 1, wherein the alternate RSSI indicates the received signal strength to a finer granularity than the default RSSI.

13. The method of claim 12, wherein displaying the default RSSI comprises displaying a first number of a first maximum number of first signal bars, wherein the first number is proportional to the received signal strength; and
wherein displaying the alternate RSSI comprises displaying a second number of a second maximum number of second signal bars, wherein the second number is proportional to the received signal strength, and wherein the first maximum number is different from the second maximum number.

14. The method of claim 1, further comprising the steps of:
updating display of the default RSSI at a first RSSI update frequency; and
updating display of the alternate RSSI at a second RSSI update frequency that is faster than the first RSSI update frequency.

15. A wireless communication device comprising:
a processing subsystem adapted to:
produce first received signal strength (RSS) measurements of a base station signal at a first RSS measurement frequency, and determine a default RSSI value based on the first RSS measurements, wherein the first RSS measurement frequency defines a first number of seconds between each of the first RSS measurements, and wherein a default RSSI indicates a received signal strength of the base station signal,
determine whether the received signal strength has transcended a triggering RSS threshold, and
when the received signal strength has transcended the triggering RSS threshold, produce second RSS measurements of the base station signal at a second RSS measurement frequency that is greater than the first RSS measurement frequency, and determine an alternate RSSI value based on the second RSS measurements, wherein the second RSS measurement frequency defines a second number of seconds between each of the second RSS measurements, and wherein the alternate RSSI more accurately reflects real-time fluctuations in the received signal strength than the default RSSI; and
a user interface output device adapted to:
provide a user interface prompt to prompt a user of the wireless communication device to indicate that the user would like the wireless communication device to produce an alternate RSSI, wherein providing the user interface prompt is performed in response to determining that the received signal strength has transcended the triggering RSS threshold;

determine whether a user input has been received from the user that indicates that the user would like the wireless device to produce the alternate RSSI;

display the default RSSI based on the default RSSI value, and to display the alternate RSSI based on the alternate RSSI value; and wherein, when the user input has not been received, the processing subsystem is adapted to bypass production of the second RSS measurements and determination of the alternate RSSI.

16. The wireless communication device of claim 15, wherein the user interface output device is a display device.

17. The wireless communication device of claim 15, wherein the user interface output device includes one or more devices selected from a group of output devices that includes a display device, a speaker, a touchscreen, a mechanical vibration device, and an indicator light.

18. A method performed by a wireless communication device, the method comprising the steps of:

producing a default received signal strength indicator (RSSI) using first RSSI determination parameters that include a first RSS measurement frequency and a first RSSI determination function, wherein the default RSSI indicates a received signal strength of a base station signal, the first RSS measurement frequency is a frequency at which first received signal strength (RSS) measurements of the base station signal are produced, the first RSS measurement frequency defines a first number of seconds between each of the first RSS measurements, and the first RSSI determination function is a function used to produce the default RSSI using the first RSS measurements;

displaying the default RSSI;

determining whether the received signal strength has transcended a triggering RSS threshold;

when the received signal strength has transcended the triggering RSS threshold, providing a user interface prompt to prompt a user of the wireless communication device to indicate that the user would like the wireless communication device to produce an alternate RSSI, wherein providing the user interface prompt is performed in response to determining that the received signal strength has transcended the triggering RSS threshold;

determining whether a user input has been received from the user that indicates that the user would like the wireless device to produce the alternate RSSI;

producing, in response to receiving the user input, the alternate RSSI using second RSSI determination parameters that are different from the first RSSI determination parameters, wherein the second RSSI determination parameters include a second RSS measurement frequency and a second RSSI determination function, the second RSS measurement frequency is a frequency at which second RSS measurements of the base station signal are produced, the second RSS measurement frequency defines a second number of seconds between each of the second RSS measurements, the second RSS measurement frequency is greater than the first RSS measurement frequency, the second RSSI determination function is a function used to produce the alternate RSSI using the second RSS measurements, and the alternate RSSI more accurately reflects real-time fluctuations in the received signal strength than the default RSSI;

displaying the alternate RSSI; and when the user input has not been received, bypassing the steps of producing, in response to receiving the user input, the alternate RSSI using second RSSI determination parameters that are different from the first RSSI determination parameters.

19. The method of claim 18, wherein the second RSSI determination function uses fewer RSS measurements than the first RSSI determination function.

20. A method performed by a wireless communication device, the method comprising the steps of:

producing first received signal strength (RSS) measurements of a base station signal at a first RSS measurement frequency, wherein the first RSS measurement frequency defines a first number of seconds between each of the first RSS measurements;

displaying a default received signal strength indicator (RSSI) based on the first RSS measurements, wherein the default RSSI indicates a received signal strength of the base station signal;

determining whether the received signal strength has transcended a triggering RSS threshold;

when the received signal strength has transcended the triggering RSS threshold, performing steps of:

providing a user interface prompt to prompt a user of the wireless communication device to indicate that the user would like the wireless communication device to produce an alternate RSSI, wherein providing the user interface prompt is performed in response to determining that the received signal strength has transcended the triggering RSS threshold; and determining whether a user input has been received from the user that indicates that the user would like the wireless device to produce the alternate RSSI; and when the user input has been received, performing steps, in response to receiving the user input, of:

producing second RSS measurements of the base station signal at a second RSS measurement frequency that is greater than the first RSS measurement frequency, wherein the second RSS measurement frequency defines a second number of seconds between each of the second RSS measurements; and displaying the alternate RSSI based on the second RSS measurements, wherein the alternate RSSI more accurately reflects real-time fluctuations in the received signal strength than the default RSSI; and when the user input has not been received, bypassing the steps of producing the second RSS measurements and producing the alternate RSSI in response to receiving the user input.

* * * * *